May 12, 1953
E. L. FAUST
2,638,246
FEED CONTROL MEANS FOR SEED DISPENSERS
Filed May 6, 1949
2 Sheets-Sheet 1
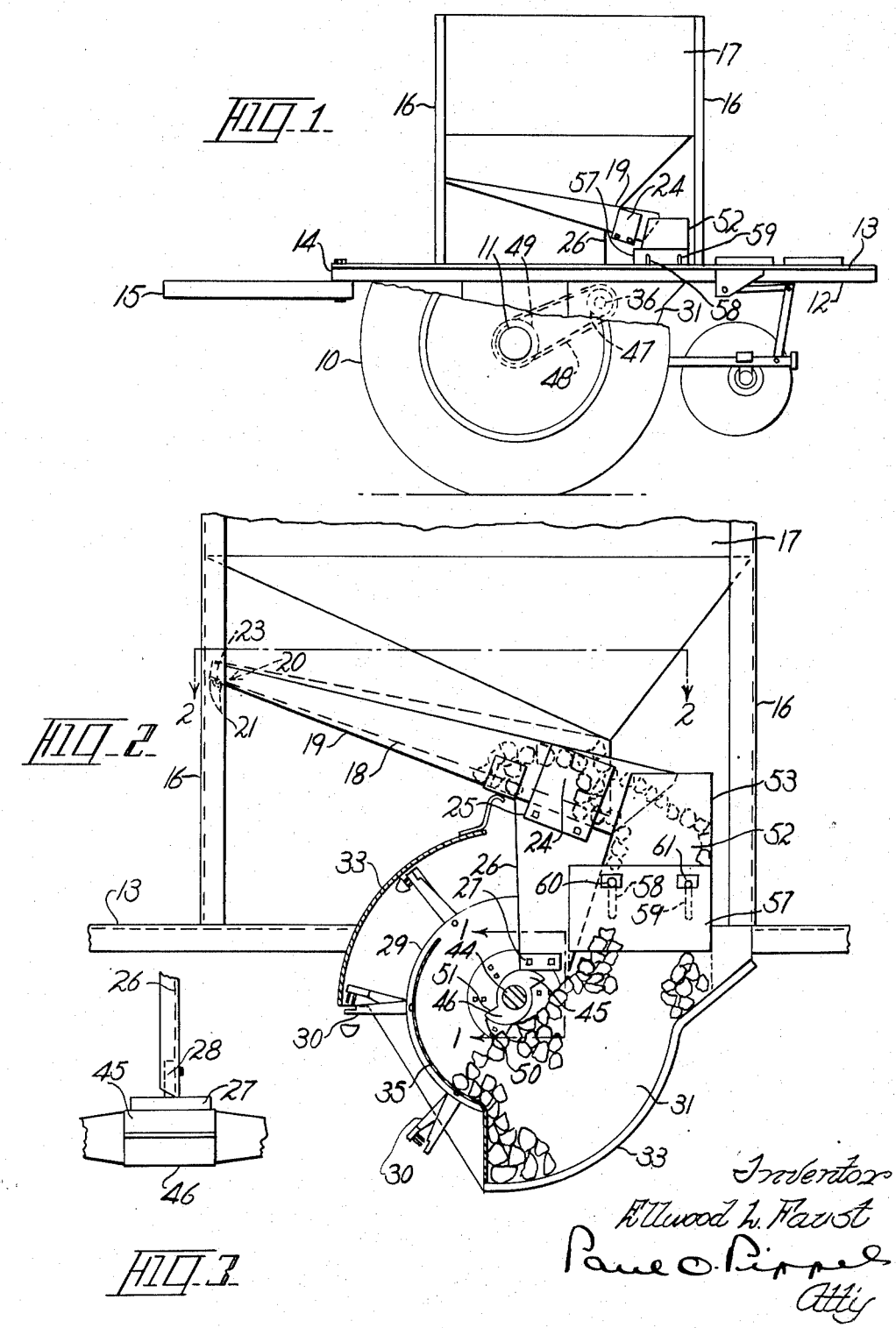

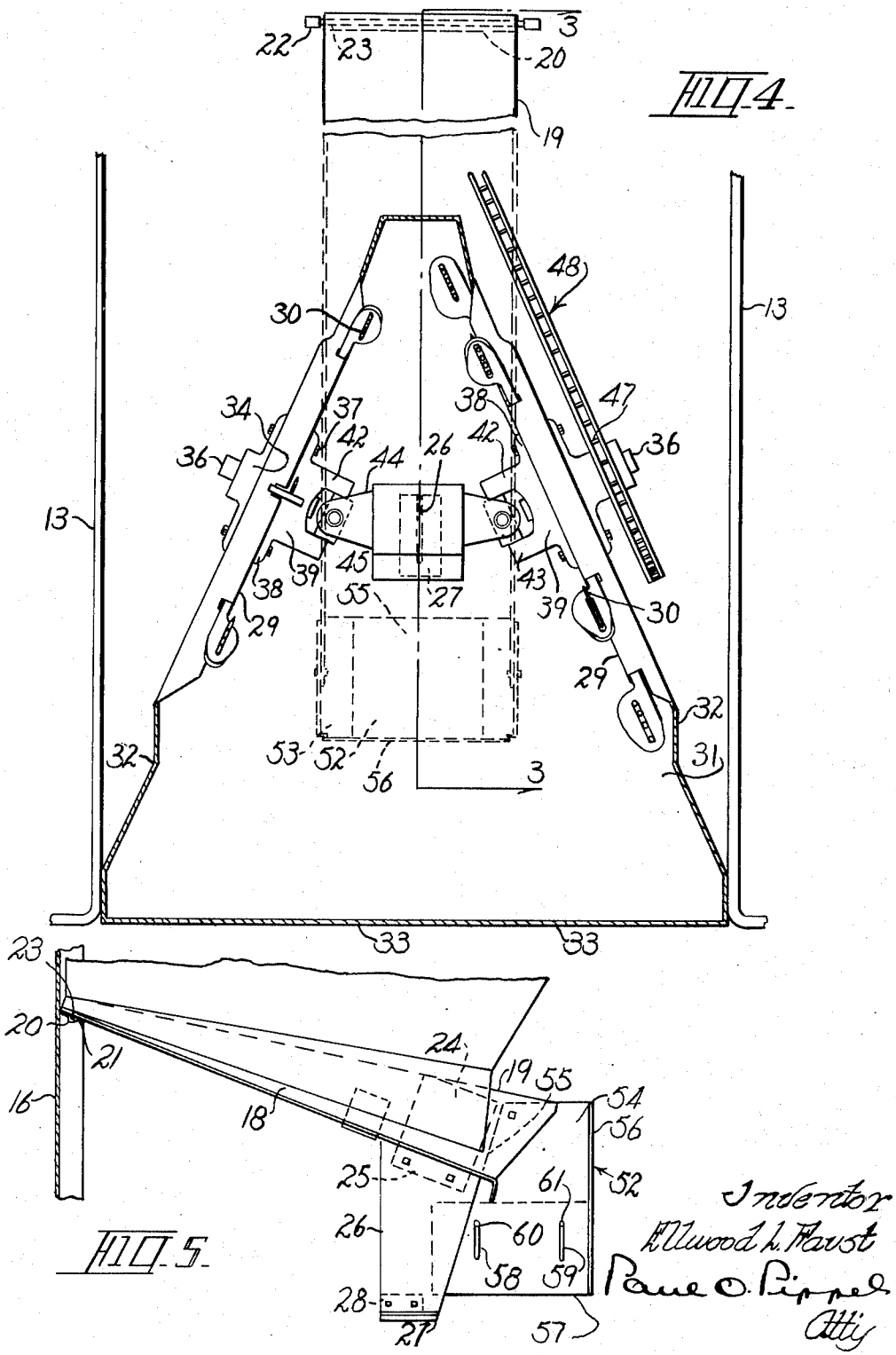

Patented May 12, 1953

2,638,246

UNITED STATES PATENT OFFICE 2,638,246

FEED CONTROL MEANS FOR SEED DISPENSERS

Ellwood L. Faust, Elmhurst, Ill., assignor to International Harvester Company, a corporation of New Jersey Application May 6, 1949, Serial No. 91,805

10 Claims. (Cl. 222—13)

This invention relates to a seed dispensing device. More specifically it relates to a potato planter of the rotary pick type wherein a uniform and continuous flow of potato seed from the seed box to the hopper is obtained by eliminating bridging of the seed and by controlling the seed level within the hopper.

Planters are known that comprise rotatable members or discs carrying picks upon which the seeds to be planted are impaled. In planters of this type, it is desirable for efficient crop planting to have a means which will insure a proper supply of seeds to the pick carrying member. Planters for potatoes or similar crops are known wherein the flow of seed from the seed box to the hopper is interrupted and not uniform since the seeds tend to crowd together and may bridge at restricted passages. Furthermore, it is important to be able to limit or control the seed level in the hopper since a deficiency of seed in the hopper would result in poor spacing between the seeds planted, and an overabundance of seeds in the hopper would seriously decrease the efficiency of the picker. Hence, the present application has to do with an improved planter of the pick-carrying type that is capable of overcoming the above disadvantages.

An object of the present invention is to provide an improved planter.

Another object is to provide an improved potato planter seed feeding means.

A further object is the provision of a seed guide means to direct the flow of seed from the hopper chute to the hopper.

Still another object is to provide a seed level limiting device which is of sturdy construction and highly effective.

A still further object is to provide an agitating and guide means which cooperate with a seed level limiting device to produce a highly efficient planter with a minimum amount of crushed or badly chopped seed.

The foregoing and other important and desirable features inherent in and encompassed by the invention, together with many of the purposes and uses thereof, will become readily apparent from a reading of the ensuing description in conjunction with the annexed drawings, in which:

Fig. 1 is a side elevational view of the improved planter of the present invention;

Fig. 2 is a side sectional view similar to Fig. 1 but showing the invention in greater detail;

Fig. 3 is a detail view of a cam surface and cam follower taken along line 1—1 of Fig. 2;

Fig. 4 is a sectional view taken along line 2—2 of Fig. 2; and

Fig. 5 is a sectional view taken along the line 3—3 of Fig. 4.

The planter, as best shown in Figs. 1, 2 and 4, includes a pair of ground supporting wheels 10 (only one of which is shown), an axle 11, and a longitudinally disposed framework designated generally as 12 comprising longitudinal members 13 suitably connected to transverse members (not shown) to form a rigid structure. The planter is adapted to be pulled through a hitch structure 14 by draft means, such as tractor 15, partially shown. The planter also includes a pair of upright frame members 16 having their lower ends rigidly secured to a longitudinal frame member 13. Similar upright frame members (not shown) project from the other longitudinal frame member and are parallel to members 16. A seed box 17 is rigidly supported by the upper ends of members 16 and has a seed discharging opening 18 in its bottom. Positioned directly beneath the seed box 17 is a substantially channel-shaped hopper chute 19. The hopper chute 19 is hingedly mounted on the seed box 17 by a channel-shaped hinge bearing pivot clip 20 provided with a pair of flanges 21 for attachment to a forward portion of the underside of the hopper chute 19. A pair of downwardly projecting pivot brackets 22 are rigidly fastened to the seed box 17, and a pivot rod 23 which seats in the channel portion of member 20 extends through an aperture formed in each bracket 22. The hopper chute 19 is further provided with an agitator arm support bracket 24, rearwardly of the hinge bearing pivot clip 20, which is U-shaped and has a downwardly projecting flange 25 providing attachment means for an agitator arm 26. The agitator arm 26 is a downwardly projecting plate having its rearward edge bent 90° from a vertical longitudinal plane to impart compressive rigidity to the arm, as best shown in Fig. 3. A cam follower 27 having a vertical upstanding flange 28 is suitably connected to the agitator arm 26.

As seen in Fig. 4, there is provided a pair of rotatable discs 29 arranged somewhat out of parallel so that their rotative axes intersect at an obtuse angle. As best seen in Figs. 2 and 4, each disc 29 has mounted thereon a plurality of radially outwardly extending pick-carrying element 30 spaced about the periphery of the discs 29. Inasmuch as the present invention is not concerned with the rotatable discs 29 and the pick-carrying elements 30, any conventional discs and pick-carrying elements may be used in lieu of the type shown.

The discs 29 with their pick-carrying elements 30 are positioned within a hopper 31, best shown in Figs. 2 and 4. The hopper 31 comprises a pair of side members 32 and a pair of central members 33. Each side member 32 comprises a central portion which has an opening in which bearing members 34 are secured. As best seen in Fig. 4, the side members 32 converge and are suitably connected to the central members 33. It will be noted that the hopper 31 has a large opening at the top for receiving the seeds to be planted and a seed discharging opening located forwardly and below the seed receiving opening which is partially closed by an arcuate tongue 35 formed on each central member 33.

Journaled within each bearing member 34 is a stub or picker shaft 36. Each disc 29 is secured by the bolts 37 to a flange 38 of a knuckle 39 secured by a pin to picker shafts 36. Each member 39 has a yoke portion 42 connected in a universal joint 43 with opposite ends of a knuckle coupling 44. The knuckle coupling 44 which is positioned midway between the side members 32 has two cam surfaces 45 and 46 diametrically disposed thereon for a purpose which will be explained hereinafter.

Referring to Fig. 4, it will be noted that the right-hand picker shaft 36 extends outwardly of the hopper and a sprocket 47 is mounted for rotation with the picker shaft 36. Sprocket 47 meshes with a chain 48 driven through sprocket 49 from axle 11 and ground supporting wheels 10. Hence, it will be observed that motion is transmitted from the sprocket 47 through the right-hand picker shaft 36 to the right-hand disc 29. The knuckle coupling 44 and the universal joints 43 transmit rotational movement from the right-hand picker shaft 36 to the left-hand disc 29.

Cam surfaces 45 and 46 are formed with a gradual rise portion 50 followed by a sharp fall portion 51. The cam follower 27 is positioned above the knuckle coupling whereby either cam surface 45 or 46 is engaged by the cam follower 27. Thus rotative movement of the knuckle coupling 44 and its associated cam surfaces 45 and 46 will impart an agitating movement to the hopper chute. On each one-half revolution of the knuckle coupling 44 the hopper chute 19 will be raised by the gradual rise portion 50 until the sharp fall portion 51 is reached when the hopper chute 19 will suddenly fall because of its weight and the weight of its associated parts and seeds within the hopper chute 19 at the time. It is therefore clear that a steady and uniform flow of seeds from the seed box 17 to the hopper 31 is insured since any tendency of the seeds to bridge is eliminated by the continuous agitating movement of the hopper chute 19.

A seed guide, designated generally by numeral 52, is positioned rearwardly of the hinge portion of the hopper chute 19 and extends downwardly into the seed receiving opening of the hopper 31 for directing the flow of seeds from the hopper chute 19 to the hopper 31. The seed guide 52 comprises a pair of transversely spaced downwardly depending side plates 53 and 54 rigidly connected to the hopper chute 19 by bolts or other suitable means. A deflector plate 55 is positioned between the side plates 53 and 54 and is suitably secured to the forward edges of the side plates 53 and 54 in a transverse substantially upright plane. Longitudinally spaced from and rearwardly of the deflector plate 55 is a back plate 56 which is rigidly fastened to the side plates 53 and 54 as by welding. A hopper seed level limiting device is located beneath the seed guide 52 and includes a downwardly depending non-metallic chute flap 57 mounted for vertical adjustment on a lower portion of each seed guide side plate 53 and 54. The flaps 57 are made of four-ply rubberized belting. However, the flaps may be made of any like material possessing like physical properties of flexibility. The vertical adjustment can be made by providing each side plate 53 and 54 with a pair of longitudinally spaced vertical slots 58 and 59 into which a pair of bolts 60 and 61 carried by each chute flap 57 may extend and be suitably secured within the seed guide by nuts (not shown). It will be apparent that since the opening area of the seed guide 52 and its associated flaps 57 is much smaller than the seed receiving opening area of the hopper 31 into which it extends, the level of the seeds in the hopper 31 can be controlled by vertical adjustment of the flaps 57. Although the seed guide 52 may be completely filled with seeds, the level maintained in the hopper 31 will be approximately that of the lowermost edge of the flaps 57. It is also noted that the seeds will not bridge in the seed guide 52 since the seed guide 52 is given an agitating movement with the hopper chute 19. The flexible flaps 57 prevent crushing and chopping of the seeds in the hopper when the seed guide 52 is agitated.

The embodiment of the invention chosen for the purposes of illustration and description herein is that preferred for achieving the objects of the invention and developing the utility thereof in the most desirable manner, due regard being had to existing factors of economy, simplicity of design, construction, production methods, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In a potato planter; the combination comprising a seed box having an open seed discharging end; a hopper chute hingedly mounted on and disposed below said seed box at the seed discharging end and adapted to receive seed from said seed box; a hopper positioned beneath said hopper chute having an opening for receiving seed flow from said hopper chute; a pair of ground wheels for supporting said potato planter; a pair of discs rotatably mounted in said hopper having radially outwardly extending picking means adapted to pick up and discharge seed from said hopper; a sprocket rotatable with said ground wheels; a second sprocket in driving engagement with one of said discs; a chain interconnecting said sprockets whereby rotation of said ground wheels transmits rotational movement to said disc having said second sprocket in driving engagement; a knuckle rigidly connected to each disc; a knuckle coupling positioned between said discs having a universal joint at each end respectively connected to the knuckles for cojoint drive of the knuckles and the discs; a pair of cam surfaces diametrically disposed on said knuckle coupling; a cam follower adapted to engage said cam surfaces; an agitator arm rigidly connected at one end to said cam follower and at its other end to a lower portion of said hopper chute whereby rotation of said knuckle coupling and its associated cam surfaces by said ground wheels imparts an agitating movement to said hopper chute; a seed guide extending into said hopper for directing the flow of seed from said hopper chute to said hopper comprising a pair of transversely spaced downwardly depending side plates rigidly connected to said hopper chute at one end thereof, a deflector plate positioned between said side plates and rigidly secured to the forward ends thereof, said deflector plate being in a transverse substantially upright plane, a back plate rigidly secured to the rearward ends of said side plates, said back plate being longitudinally spaced from said deflector plate; and hopper seed level limiting means comprising a downwardly depending non-metallic flexible chute flap mounted for vertical adjustment on a lower portion of each seed guide side plate, said flaps extending into the seed receiving opening in said hopper.

2. In a seed dispensing device, the combination comprising a hopper chute; a hopper positioned below said hopper chute and having an opening for receiving seed flow from said hopper chute; a seed guide rigidly connected to the hopper chute and depending downwardly into said hopper; a hopper seed level limiting means associated with said seed guide, said means including a pair of flexible non-metallic transversely spaced downwardly depending chute flaps adjustably mounted on said seed guide; a pair of rotatable discs positioned within said hopper having seed picking means disposed about their peripheries adapted to pick-up and discharge seed from said hopper; drive means for rotating one of said discs; means for imparting driving movement from said one disc to the other disc, said means being positioned between said discs and comprising a knuckle coupling provided with a universal joint at each end respectively connected to the discs for cojoint drive of the discs; a pair of cam surfaces diametrically disposed on said knuckle coupling; and means adapted to engage and be actuated by rotation of said cam surfaces, said means including a downwardly depending portion of said hopper chute.

3. In a seed dispensing device, the combination comprising a hopper chute; a hopper positioned below said hopper chute and having an opening for receiving seed flow from said hopper chute; a seed guide connected to said hopper chute and depending downwardly into said hopper; a hopper seed level limiting means cooperable with said seed guide; a plurality of rotatable discs positioned within said hopper having seed picking means disposed about their peripheries adapted to pick up and discharge seed from said hopper; drive means for rotating one of said discs; means for imparting driving movement from said one disc to the other discs, said means being disposed under the opening in said hopper, said means having a cam surface disposed thereon; and means adapted to engage and be actuated by rotation of said surface including a downwardly depending portion of said hopper chute extending through said opening in said hopper.

4. In a potato planter having ground wheels for supporting the potato planter, the combination comprising a seed box having an open seed discharging end; a hopper positioned beneath said hopper chute having an opening for receiving seed flow from said hopper chute; a pair of discs rotatably mounted in said hopper having radially outwardly extending picking means adapted to pick up and discharge seed from said hopper; a sprocket rotatable with said ground wheels; a second sprocket in driving engagement with one of said discs; a chain interconnecting said sprockets whereby rotation of said ground wheels transmit rotational movement to said disc having said second sprocket in driving engagement; a knuckle rigidly connected to each disc; a knuckle coupling positioned between said discs having a universal joint at each end respectively connected to the knuckles for cojoint drive of the knuckles and the discs; a pair of cam surfaces diametrically disposed on said knuckle coupling beneath the opening in said hopper; a cam follower adapted to engage said cam surfaces; an agitator arm rigidly connected at one end to said cam follower and at its other end to a lower portion of said hopper chute whereby rotation of said knuckle coupling and its associated cam surfaces by said ground wheels imparts an agitating movement to said hopper chute, said agitator arm extending through the opening in said hopper.

5. In a seed dispenser having ground wheels for supporting the seed dispenser, the combination comprising a seed box; a hopper chute hingedly mounted on and disposed below said seed box; a hopper positioned beneath said hopper chute and having an opening for receiving seed flow from said hopper chute; a pair of rotatable discs positioned within said hopper having seed picking means disposed about their peripheries adapted to pick up and discharge seed from said hopper; drive means for rotating one of said discs; means for imparting driving movement from said one disc to the other disc, said means being positioned between said discs and comprising a knuckle coupling provided with a universal joint at each end respectively connected to the discs for cojoint drive of the discs, said means being disposed under said opening in said hopper; a pair of cam surfaces diametrically disposed on said knuckle coupling; and means adapted to engage and be actuated by rotation of said cam surfaces, said means including a downwardly depending portion of said hopper chute extending through said opening in said hopper.

6. In a seed dispenser having ground wheels for supporting the seed dispenser, the combination comprising a hopper chute; a hopper positioned below said hopper chute having an opening for receiving seed flow from said hopper chute; a plurality of rotatable discs positioned within said hopper having seed picking means disposed about their peripheries adapted to pick up and discharge seed from said hopper; drive means for rotating one of said discs; means for imparting driving movement from said one disc to the other discs, said means having a cam surface disposed thereon and being disposed under said opening in said hopper; and means adapted to engage and be actuated by rotation of said cam surface, including a downwardly depending portion of said hopper chute extending through said opening in said hopper.

7. In a potato planter having ground wheels for supporting the potato planter, the improvement comprising a seed box having an open seed discharging end; a hopper chute hingedly mounted on and disposed below said seed box at the seed discharging end, said hopper chute adapted to receive seed from said seed box; a hopper positioned beneath said hopper chute having an opening for receiving seed flow from said hopper chute; a seed guide extending into the hopper for directing the flow of seed from said hopper chute to said hopper comprising a pair of transversely spaced downwardly depending side plates rigidly connected to said hopper chute at one end thereof, a deflector plate positioned between said side plates and rigidly secured to the forward ends thereof, said deflector plate being in a transverse substantially upright plane, a back plate rigidly secured to the rearward ends of said side plates, said back plate being longitudinally spaced from said deflector plate; and hopper seed level limiting means comprising a downwardly depending non-metallic flexible chute flap mounted for vertical adjustment on a lower portion of each seed guide side plate, said flaps extending into the seed receiving opening in said hopper.

8. In a seed dispensing device, the improvement comprising a hopper chute; a hopper positioned below said hopper chute and having an opening for receiving seed flow from said hopper chute; a seed guide rigidly connected to the hopper chute and depending downwardly into said hopper; and a hopper seed level limiting means associated with said seed guide, said means including a pair of flexible non-metallic transversely spaced downwardly depending chute flaps adjustably mounted on said seed guide.

9. In a potato planter having ground wheels for supporting the potato planter, the improvement comprising a seed box having an open seed discharging end; a hopper chute hingedly mounted on and disposed below said seed box at the seed discharging end, said hopper chute adapted to receive seed from said seed box; a hopper positioned beneath said hopper chute having an opening for receiving seed flow from said hopper chute; a seed guide extending into the hopper for directing the flow of seed from said hopper chute to said hopper comprising a pair of transversely spaced downwardly depending side plates rigidly connected to said hopper chute at one end thereof, a deflector plate positioned between said side plates and rigidly secured to the forward ends thereof, said deflector plate being in a transverse substantially upright plane, a back plate rigidly secured to the rearward ends of said side plates, said back plate being longitudinally spaced from said deflector plate; and hopper seed level limiting means comprising a downwardly depending flexible chute flap mounted for vertical adjustment on a lower portion of each seed guide side plate, said flaps extending into the seed receiving opening in said hopper.

10. In a seed dispensing device, the improvement comprising a hopper chute; a hopper positioned below said hopper chute and having an opening for receiving seed flow from said hopper chute; a seed guide rigidly connected to the hopper chute and depending downwardly into said hopper; and a hopper seed level limiting means associated with said seed guide, said means including a pair of flexible transversely spaced downwardly depending chute flaps adjustably mounted on said seed guide.

ELLWOOD L. FAUST.

References Cited in the file of this patent
UNITED STATES PATENTS

| Number | Name | Date |
|---|---|---|
| 2,100,315 | Harper | Nov. 30, 1937 |
| 2,403,376 | Kaupke et al. | July 2, 1946 |